(12) United States Patent
An et al.

(10) Patent No.: US 6,494,593 B2
(45) Date of Patent: Dec. 17, 2002

(54) FOLDABLE CASE HAVING BACK LIGHT

(75) Inventors: Myung Sup An, Pyungtaek (KR); Jin Kwan Choi, Sungnam (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 09/754,357

(22) Filed: Jan. 5, 2001

(65) Prior Publication Data

US 2001/0009509 A1 Jul. 26, 2001

(30) Foreign Application Priority Data

Jan. 7, 2000 (KR) .............................................. 00-718

(51) Int. Cl.[7] .............................................. F21V 21/00
(52) U.S. Cl. ........................ 362/249; 362/561; 362/99; 362/31; 362/29; 361/681; 349/65; 349/61
(58) Field of Search ................................. 362/249, 561, 362/31, 26, 27, 29, 85, 812, 99; 349/65, 61; 361/681

(56) References Cited

U.S. PATENT DOCUMENTS 5,815,225 A * 9/1998 Nelson ........................ 349/665
5,918,396 A * 7/1999 Jung ............................ 40/546

* cited by examiner

Primary Examiner—Stephen Husar
Assistant Examiner—Bertrand Zeade
(74) Attorney, Agent, or Firm—Birch, Stewart, Kolasch & Birch, LLP

(57) ABSTRACT

A foldable case having a back light is disclosed that a specific printed or injection-molded mark and a logo are emitted on a foldable case with which a liquid crystal display unit is integrally formed. The ON/OFF state of a power source of a liquid crystal display unit can be easily recognized even in a state that a foldable case is closed, and a specific mark or logo printed or injection-molded on an outer surface of the foldable case integrally formed with the liquid crystal display has a back light, so that divers desires of users can be satisfied as well as providing an elegant appearance.

17 Claims, 3 Drawing Sheets

FOLDABLE CASE HAVING BACK LIGHT

BACKGROUND OF THE INVENTION

1. Field of the Invention

The present invention relates to a foldable case, and more particularly to a foldable case having a back light that a specific printed or injection-molded mark and a logo are emitted on a foldable case with which a liquid crystal display unit is integrally formed.

2. Description of the Background Art

Recently, various electronics products having a liquid crystal display unit are being compact to be portable. For example, a cellular phone or a lap-top computer is manufactured to come out in a market in a manner that a liquid crystal display unit, such as an LCD, is integrally formed at a foldable case which is rotatably opened and closed with a main body, facilitating using and carrying.

As a foldable electronic product having a liquid crystal display unit, the lap-top computer is taken for an embodiment of the present invention and will now be described with reference to the accompanying drawings.

FIG. 1 shows a construction of a general lap-top computer in accordance with a conventional art.

As shown in the drawing, the general lap-top computer includes a foldable case 10 with which a liquid crystal display unit 30 implemented as an LCD is integrally formed, and a main body part 50 hinged with the foldable case 10. The main body part 50 includes a power source button 40 and a key board 60 formed at one side thereof.

As shown in FIG. 2, the LCD implementing the liquid crystal display unit 30 includes a light emitting part 21 forming a predetermined empty space in contact with a front inner surface of the case 20, from viewing that the outer side of the foldable case 10 is regarded as a back side surface, forming an empty space; a liquid crystal element 22 formed on the light emitting part 21 for selectively blocking the light emitted from the light emitting part by an applied electric signal to display a text or an image; and a transparent protective plate 23 formed in contact with the whole side surface of the liquid crystal element 22, for protecting the liquid crystal element 22.

The front inner surface of the case 20 contacting the light emitting part 21 which forms an empty space serves as a reflector so that the light generated from a light source of the light emitting part 21 is collectively projected on a display surface of the liquid crystal display unit 30 after passing the liquid crystal element 22 and the transparent protective plate 23.

The power source button 40 formed at the main body part 50 is functioned as a main power source of the lap-top computer, to simultaneously turn on or turn off the power source of the system and the display unit 30. In case where a user intends to finish using of the lap-top computer, typically, he or she switches off the power source button 40 and rotatably combines the foldable case 10 to the main body part 50 for keeping or carrying.

However, as for the conventional .lap-top computer, in case where the user inadvertently rotates the foldable case to the main body part in a state that the power source button is not switched to the OFF terminal, a problem arises that the user could not recognize whether the power source of the liquid crystal display unit has been turned on or turned off.

Failure to recognize the ON/OFF state of the liquid crystal display unit consuming much power is a big problem in view of characteristics of the lap-top computer carried with battery mounted.

Meanwhile, a recent tendency shows that a mark or a logo is attached on the outer surface of the foldable case for a product promotion or a brand image creation. In this respect, however, an attachment of a simple mark or a log does not satisfy the diverse desires of users.

SUMMARY OF THE INVENTION

Therefore, an object of the present invention is to provide a foldable case having a back light by which the ON/OFF state of a power source of a liquid crystal display unit can be easily recognized even in a state that a foldable case is closed, and a specific mark or logo printed or injection-molded on an outer surface of the foldable case integrally formed with the liquid crystal display has a back light, so that divers desires of users can be satisfied as well as providing an elegant appearance.

To achieve these and other advantages and in accordance with the purpose of the present invention, as embodied and broadly described herein, there is provided a foldable case having a back light including: a light emitting part formed having an empty space in contact with a front inner surface of the case and a rear side surface of a liquid crystal element, for evenly distributing light, a liquid crystal element installed at the front surface of the light emitting part, and selectively blocking the light emitted from the light emitting part to display a text or an image; a transparent protective plate formed in contact with the front surface of the liquid crystal element to protect the liquid crystal element; and a case for supportedly combining the light emitting part, the liquid crystal element and the transparent protective plate, reflecting the light of the light emitting part so as to be injected onto the whole surface of the liquid crystal element, and having a light transmittance hole on the section of its body so as to have a back light on a specific mark or logo of the rear surface thereof.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
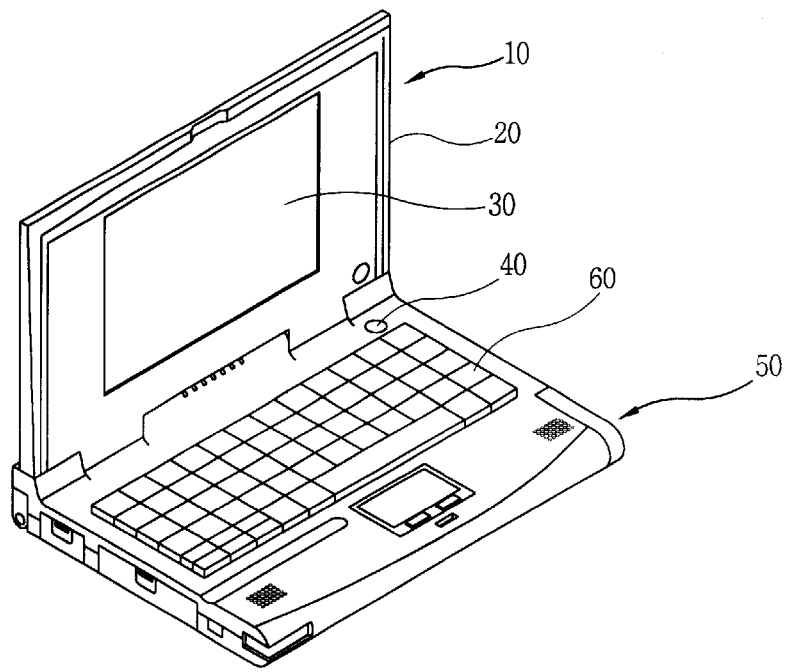
FIG. 1 is an exemplary view of a general lap-top computer having a liquid crystal display in accordance with a conventional art.
Figure 2:
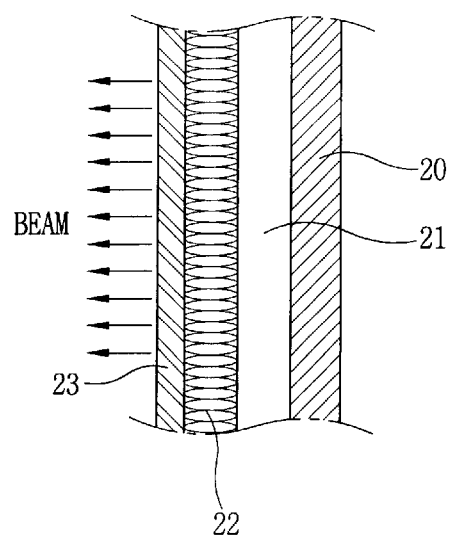
FIG. 2 is a partial sectional view of a foldable case of the general lap-top computer in accordance with the conventional art.
Figure 3:
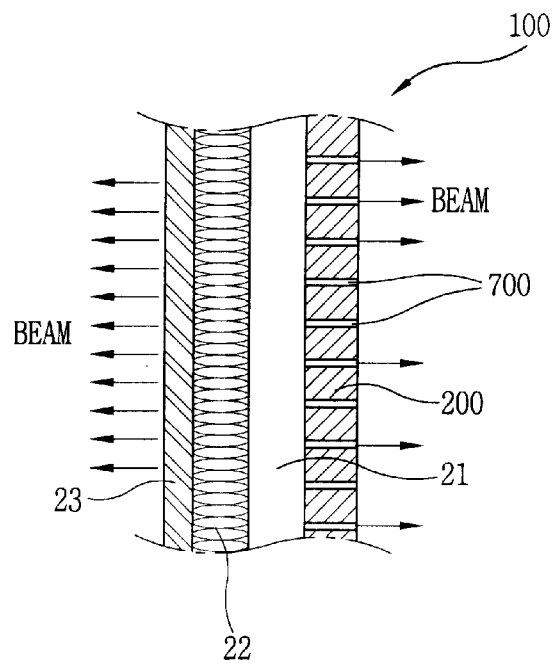
FIG. 3 is a partial sectional view of a foldable case of a lap-top computer adopting the foldable case having a back light in accordance with the present invention.
Figure 4:
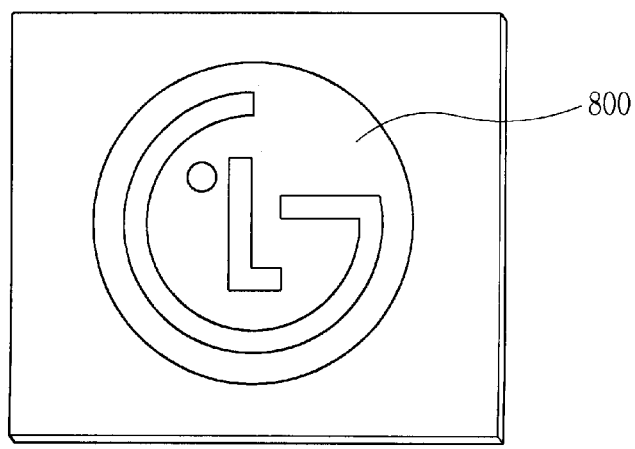
FIG. 4 is an exemplary view of a mark or a logo applied on an outer surface of the foldable case having a back light in accordance with the present invention.
Figure 5:
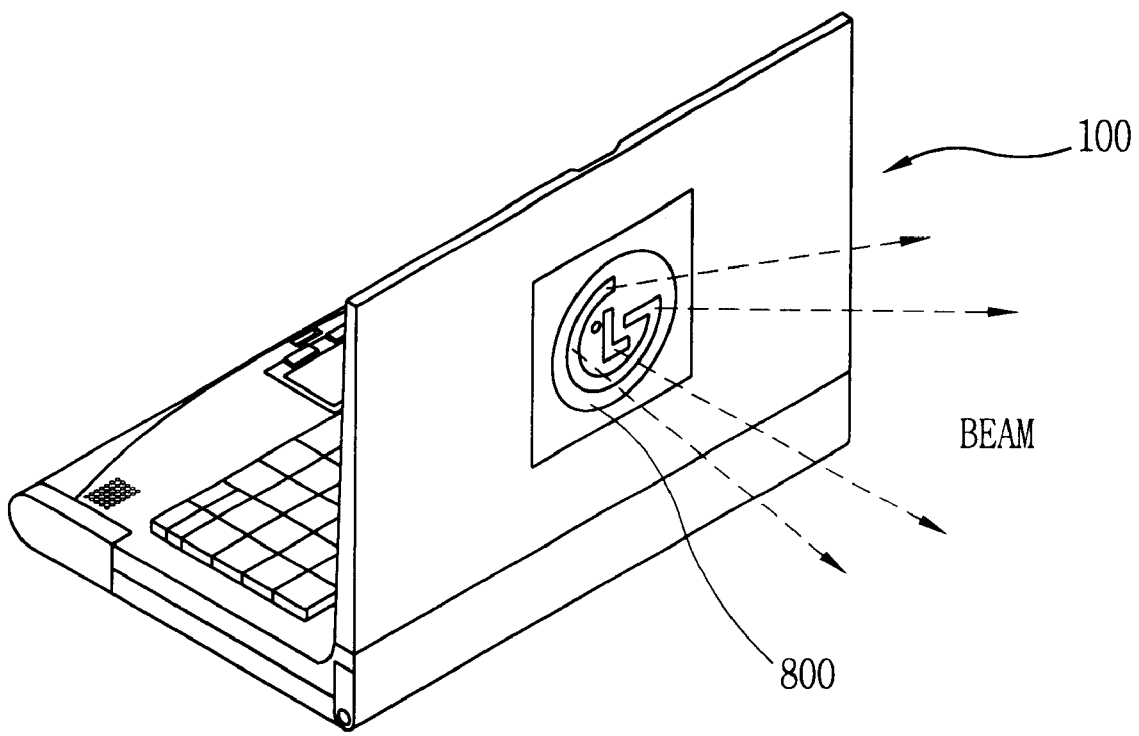
FIG. 5 is a perspective view of a lap-top computer adopting the foldable case having a back light in accordance with the present invention.

FIG. 3 is a partial sectional view of a foldable case of a lap-top computer adopting the foldable case having a back light in accordance with the present invention.

The same elements as in the conventional art are given the same reference numerals.

With reference to FIG. 3, the foldable case having a back light of the present invention is constructed as follows.

First, the liquid crystal display unit 30 includes a light emitting part 21 forming a predetermined empty space in contact with the front inner side surface of a case 200 and a rear side surface of a liquid crystal element 22; a liquid crystal element 22 formed at the front surface of the light emitting part 21, for selectively blocking the light emitted from the light emitting part 21 by an applied electric signal; and a transparent protective plate 23 formed in contact with the front surface of the liquid crystal element, for protecting the liquid crystal element 22.

The foldable case having a back light of the present invention includes the case 200 provided to supportedly combine the liquid crystal display unit 30 and elements of the liquid crystal display unit 30.

A plurality of light transmittance holes 700 are formed at the section of the case 200, so that light emitted from the light emitting part 21 is projected on the front surface, and at the same time, a part of the light passes the light transmittance holes 700 to be projected. Thus, a specific mark or logo attached on the outer surface of the case 200 or integrally injection-molded on the case has a back light.

The light transmittance holes 700 may remain empty or be filled with a transparent and a translucent material according to an embodiment.

Referring to the specific mark or logo 800 formed on the outer surface of the case 200, a printed light transmittance sheet is attached on the outer surface of the case 200 according to a silk printing method, one of a printing technique, or a light transmittance sheet with a printed a specific mark or logo 800 is inserted when the case 200 is injection-molded. That is, a specific mark or logo 800 is formed by in-mold method, integrating with the case.

The printed sheet is designed in a manner that its color and quality are differently combined to distinctively express what the design intends to indicate when light is transmitted.

The operation of the foldable case having a back light of the lap-top computer in accordance with the present invention will now be described.

First, when the power source button 40 installed at the main body part 50 of the lap-top computer is switched 'ON' and power is supplied to the system and the liquid crystal display unit 30 of the lap-top computer, the power is applied to the light emitting part 21 of the liquid crystal display unit 30, emitting a light of a predetermined brightness.

The emitted light passes the liquid crystal element 22 and the transparent protective plate 23 and is injected to whole surface of the liquid crystal display unit 30. At this time, a part of the emitted light passes the plurality of light transmittance holes 700 formed on the section of the case 200 and is projected so as for the specific mark and logo attached on the outer surface of the case 200 to have a back light.

Accordingly, if the foldable case 100 is closed in a state than the power source button 40 is not switched to OFF. due to the user's inadvertence, the user can easily recognize the ON/OFF state of the power source of the liquid crystal display unit through the back light from the specific mark and logo printed or injection-molded on the case 200.

As so far described, the foldable case having a back light of the present invention has the following effects:

First, when the foldable case is closed, the ON/OFF state of the display unit can be easily recognized by the user through the specific mark or logo with back light formed at the outer surface of the foldable case, so that unnecessary power consumption due to the user's inadvertence is prevented in the liquid crystal display unit which is to consume much power in view of the characteristics of the lap-top computer.

Secondly, as the specific mark or logo with back light formed on the outer surface of the foldable case emits during use of the lap-top computer, the outer appearance of the product looks elegant, satisfying the desires of many consumers.

Lastly, a lap-top computer adopting the foldable case of the present invention would improve the publicity of the product itself and help heighten the image of the brand.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A foldable case having a front inner surface and a rear outer surface, the foldable case comprising:

a light emitting unit provided in the foldable case;

a liquid crystal element provided in front of the light emitting unit, for displaying text or an image by the light emitted from the light emitting unit; and rear illumination means for illuminating the rear outer surface of the case by light emitted from the light emitting unit.

2. The foldable case according to claim 1, wherein the rear illumination means comprises a panel having a specific marking or light transmittance holes formed as a logo.

3. The foldable case according to claim 2, wherein the specific marking is printed on a light transmittance sheet.

4. The foldable case according to claim 3, wherein the light transmittance sheet is integrally formed with the case.

5. The foldable case according to claim 2, wherein the light transmittance holes are empty.

6. The foldable case according to claim 2, wherein the light transmittance holes are filled with a transparent material.

7. The foldable case according to claim 2, wherein the light transmittance holes are filled with a translucent material.

8. In a display device having a case having a front inner surface and a rear outer surface, a light emitting unit provided in the case and a liquid crystal element provided in front of the light emitting unit, for displaying text or an image by the light emitted from the light emitting unit, the improvement comprising:

rear illumination means for illuminating the rear outer surface of the case by light emitted from the light emitting unit.

9. The display device according to claim 8, wherein the rear illumination means comprise light transmittance holes formed in a section of a body of the case between the front inner surface of the case and the rear outer surface thereof.

10. The display device according to claim 8, wherein the rear illumination means comprises a panel having a specific marking or light transmittance holes formed as a logo.

11. The display device according to claim 10, wherein the specific marking is printed on a light transmittance sheet.

12. The display device according to claim 11, wherein the transmittance sheet is integrally formed with the case.

13. The display device according to claim 10, wherein the light transmittance holes are empty.

14. The display device according to claim 10, wherein the light transmittance holes are filled with a transparent material.

15. The display device according to claim 10, wherein the light transmittance holes are filled with a translucent material.

16. The display device according to claim 8, wherein the case is a folding case of a portable computer or telephone.

17. The display device according to claim 8, wherein the front inner surface of the case serves as a reflector.

* * * * *